A. E. BLOOMFIELD.
MAP.
APPLICATION FILED DEC. 16, 1920.

1,390,079. Patented Sept. 6, 1921.
4 SHEETS—SHEET 1.

INVENTOR
Arthur E. Bloomfield
BY
Davis
his ATTORNEYS

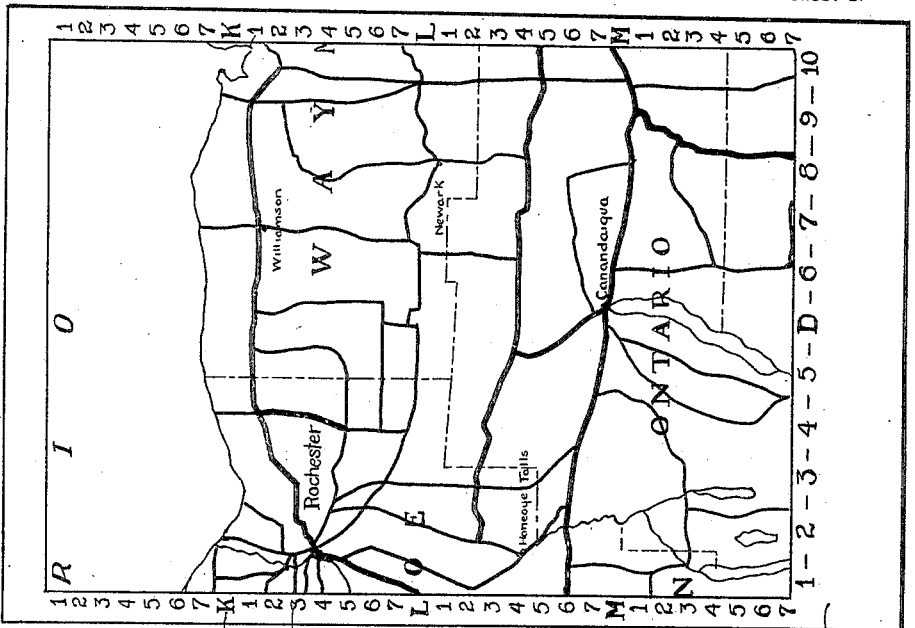
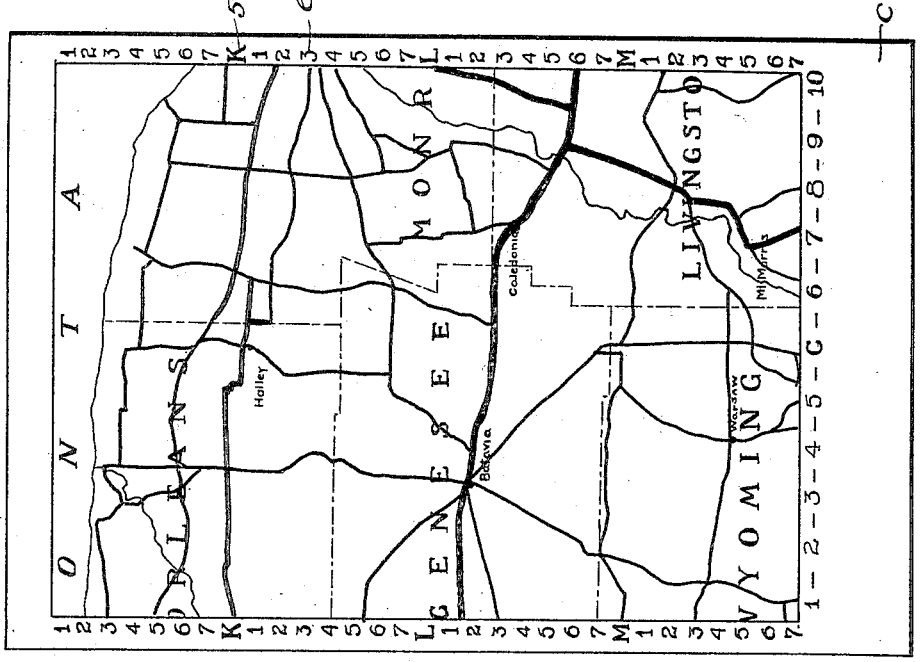

A. E. BLOOMFIELD.
MAP.
APPLICATION FILED DEC. 16, 1920.

1,390,079.

Patented Sept. 6, 1921.
4 SHEETS—SHEET 3.

INVENTOR
Arthur E. Bloomfield
BY
his ATTORNEYS

A. E. BLOOMFIELD.
MAP.
APPLICATION FILED DEC. 16, 1920.

1,390,079.

Patented Sept. 6, 1921.
4 SHEETS—SHEET 4.

INVENTOR
Arthur E. Bloomfield
BY
Davis & Timms
his ATTORNEYS

UNITED STATES PATENT OFFICE.

ARTHUR E. BLOOMFIELD, OF ROCHESTER, NEW YORK.

MAP.

1,390,079.   Specification of Letters Patent.   Patented Sept. 6, 1921.

Application filed December 16, 1920. Serial No. 431,195.

*To all whom it may concern:*

Be it known that I, ARTHUR E. BLOOMFIELD, a citizen of the United States, and resident of Rochester, in the county of Monroe and State of New York, have invented certain new and useful Improvements in Maps, of which the following is a specification.

The present invention relates to maps and an object thereof is to provide a map of a given geographical area divided into parallel sets of sections arranged in book form in such a manner that the sections may be readily found and any point on the edge of one section may be readily located on the matching edge of another section, either of its set or of an adjacent set.

To this and other ends the invention consists of certain parts and combinations of parts, all of which will be hereinafter described, the novel features being pointed out in the appended claims.

In the drawings:

Figs. 2 and 3 are enlarged sections from two adjacent parallel sets;

Figure 1:
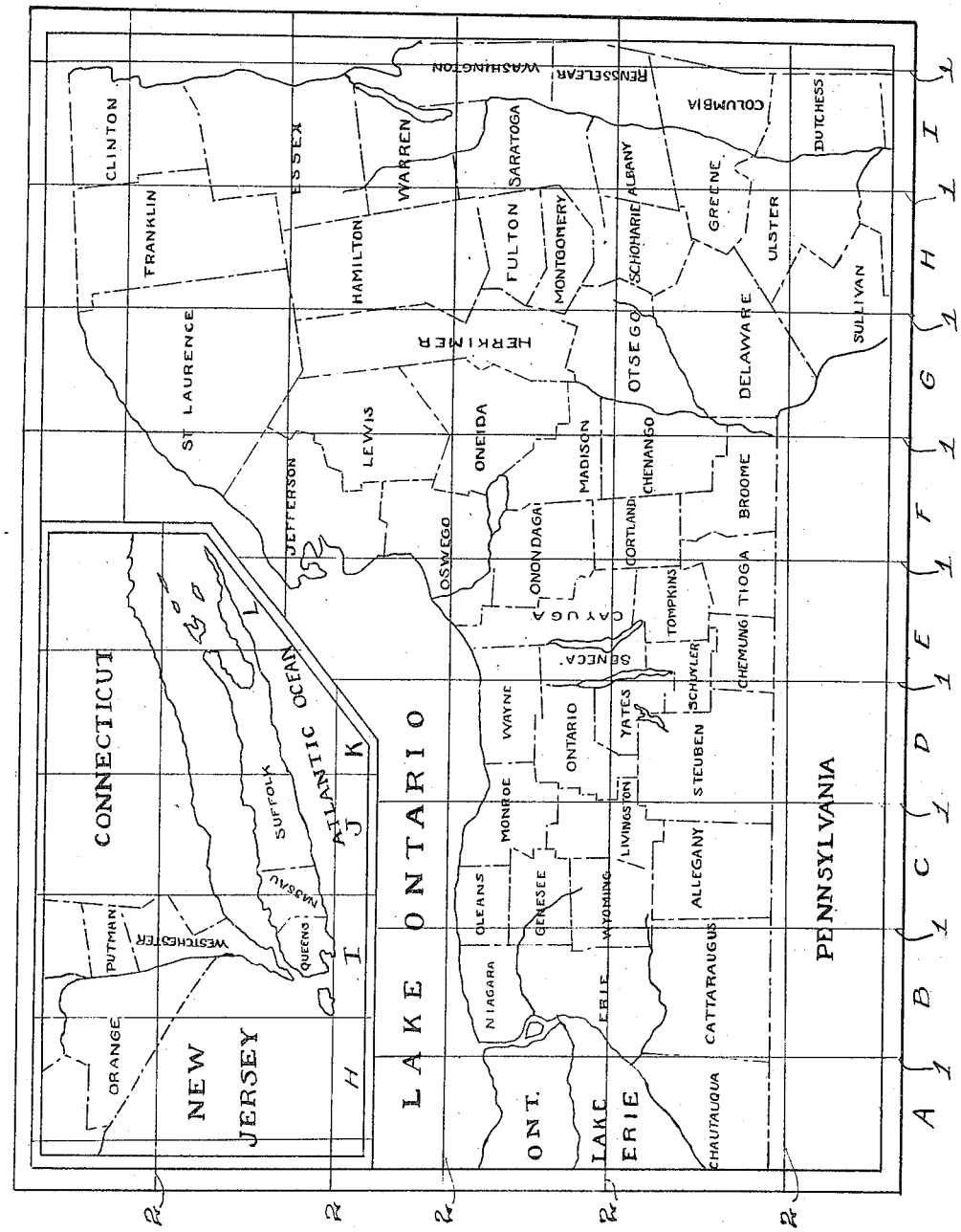
Figure 1 is a map of a geographical area showing the manner in which the map is cut to provide the parallel sets of sections.
Figure 5:
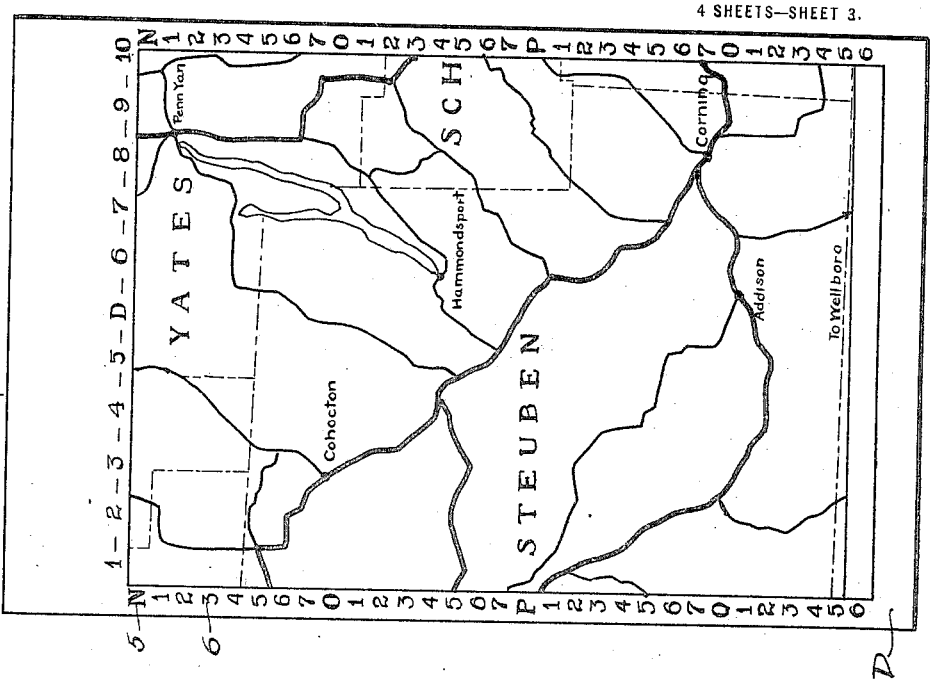
Figs. 4 and 5 are two different enlarged sections from the same parallel sets illustrated in Figs. 2 and 3.
Figure 4:
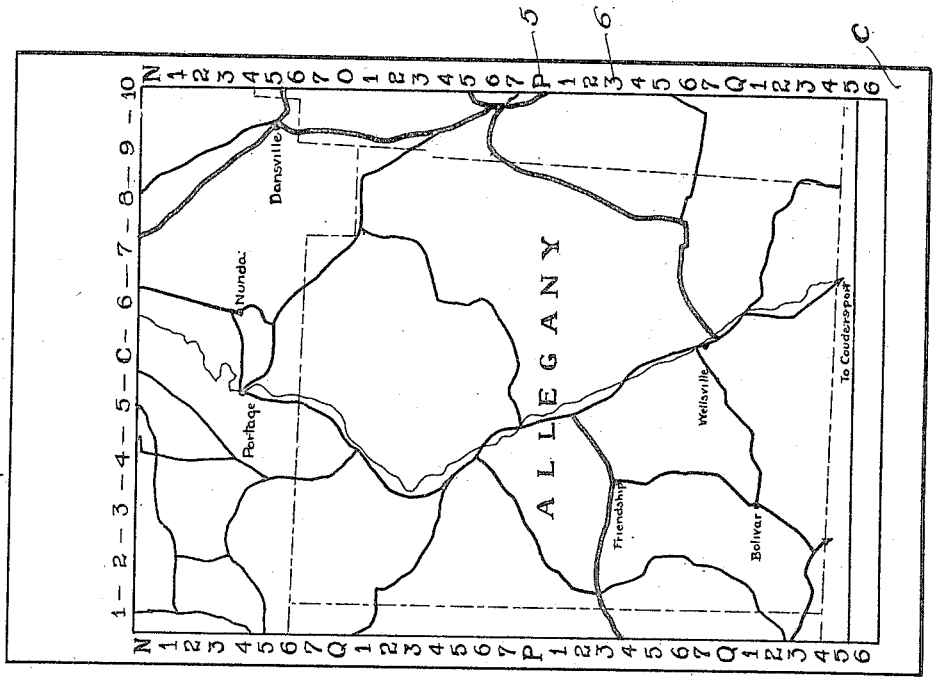

In the illustrated embodiment of this invention, a map of the State of New York is divided into sets or parallel sections, division lines between the sets being indicated by the reference characters 1 and the division lines between the sections of the sets being indicated by the reference characters 2. The different sets of sections are indicated by the reference characters A to I inclusive. These matching map sections are bound in book form, the sections being so arranged that each set has its members positioned on successive pages of the book in the order in which the members occur in the set from one and the same side of the map area. For instance, in the map area illustrated in Fig. 1, the sections in the set A will occur first, then the sections in the set B, and so on throughout the map area, the northern or uppermost sections being first in each set and then the other sections of the set following in the order in which they occur from the uppermost or northern section. While in this embodiment the sets run north and south, it is apparent that the invention is not limited to this arrangement.

Figure 6:
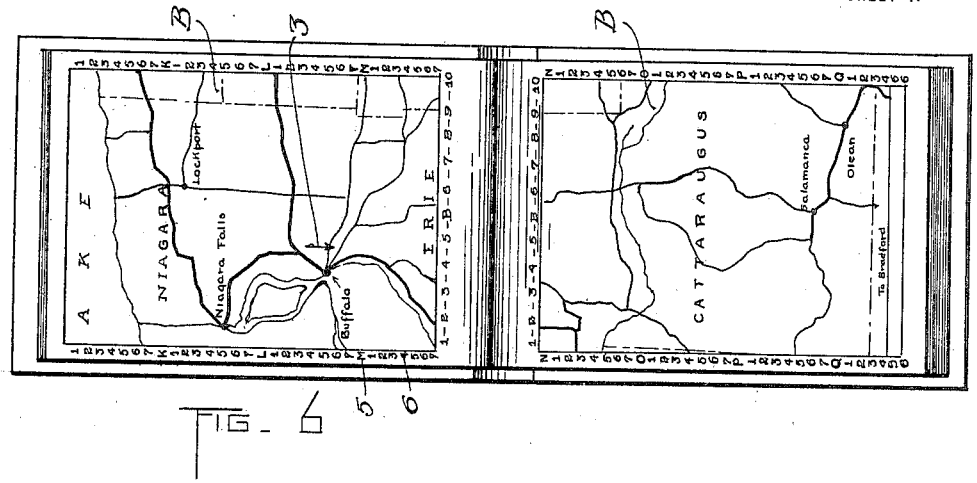
Fig. 6 shows the book open, the two pages exposed illustrating two map sections in a set different from that shown in Figs. 2 to 5 inclusive.
Figure 7:
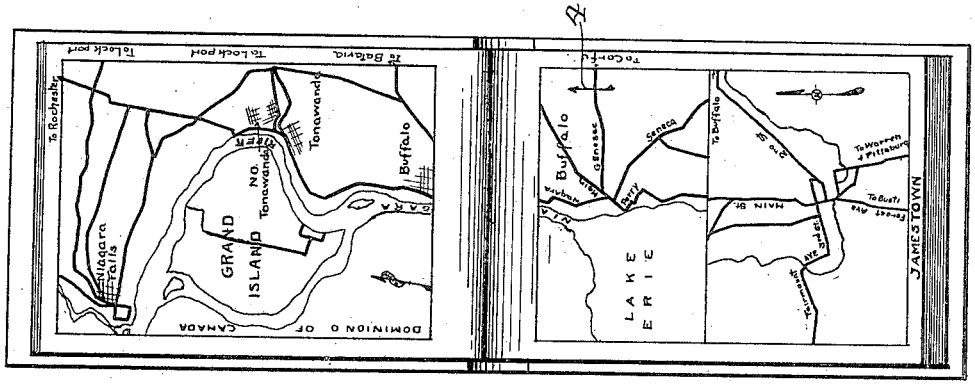
Fig. 7 is a view of the book map open and showing two pages having enlargements of the portions of the map sections illustrated in the book.
Figure 8:
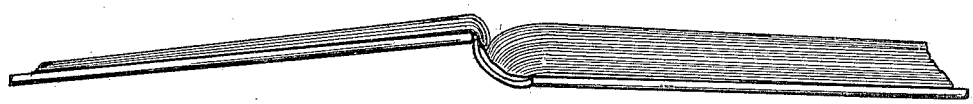
Fig. 8 is an edge view of the book map open.

In Figs. 2 to 5 inclusive of the drawings, enlargements of two adjacent or matching sets are shown, being the sets C and D of Fig. 1, while in Fig. 6 another set of sections is illustrated, being the set indicated by the reference character B of Fig. 1. The sections are arranged so that the matching edges of the sections are arranged in proximity to the bound edges of the pages when the sections are on opposed pages and at the outer edge of the page when the matching sections of a set are on the opposite sides of a single leaf.

Between the sets, the pages of the book may be provided with enlarged maps or portions of the sections of adjacent sets and when such enlarged maps are provided, as for instance, the map of a city. the section on which the city is shown will be provided with an arrow or other indicating mark 3 which will point in a direction to indicate the position of the enlargement of said city, while the city enlargement will be provided with an arrow or other indicating means indicated at 4 which will point to the direction in the book in which the section showing such city is arranged.

Each section is also provided along its matching edges with indicating means preferably comprising letters 5 and numbers 6, the letters on the matching edges between the sections of each set being the same throughout the sections of a set, but different from those on the sections of the other sets, while the letters on the matching edges between the sets, differ in the different members of each set but are the same throughout the sets, that is, like letters are provided on opposite side edges of two matching sections in two different sets.

In using the map, assuming that one is traveling from one section to an adjacent section in the same set, then such adjacent section will occur on the page next to the one in which the traveler is leaving and the position will be obtained by finding a number situated on the matching edge of the adjacent section like the one on the section from which the traveler is passing. Should one be traveling from a section in one set to a section in an adjacent set, then by referring to the indicating matter at the edge of the section which the traveler is leaving, and taking note of the letters and the number at the point where the road leaves such section, this road may be found immediately by referring to the same letters and number on the matching edge of the adjacent set.

From the foregoing it will be seen that there has been provided a book map in which the sections are arranged in such a manner that a point on the edge of one section may be readily found on the edge of a matching section. The sections are formed by dividing a map of a given geographical area along parallel lines in two directions at right angles to each other, thereby forming a plurality of parallel sets of sections. Indicating means is provided which makes it possible to readily locate a given point on the matching edges of two sections in any one set or upon the matching edges of two sections in any two adjacent sets. Enlargements of cities or other areas on the different sections are provided and these enlargements as well as the sections are provided with indicating means which will point the direction in which the leaves are to be turned in order to find the corresponding part.

What I claim as my invention and desire to secure by Letters Patent is:

1. A book map having pages provided with matching sections of a map of a given geographical area, the sections being formed by divisions of the map area in two directions at right angles to each other providing parallel sets, each set having its members arranged on successive pages of the book in the order in which the members occur in the set from one side of the map area, each section being provided at those edges which match with the members of its set, with means which will indicate any position on its edge, on the matching edge of its matching member, the parallel sets of sections being arranged in the book in the order in which they occur from one side of the map and the sections also having their matching edges between the sets provided with indicating means by which any position on the edge of a member of one set may be found on the edge of a section of a matching set.

2. A book map having pages provided with matching sections of a map of a given geographical area, the sections being formed by divisions of the map area in two directions at right angles to each other providing parallel sets, each set having its members arranged on successive pages of the book in the order in which the members occur in the set from one side of the map area, each section being provided at those edges which match with the members of its set, with means which will indicate any position on its edge, on the matching edge of its matching member, the parallel sets of sections being arranged in the book in the order in which they occur from one side of the map and the sections also having their matching edges between the sets provided with indicating means by which any position on the edge of a member of one set may be found on the edge of a section of a matching set, pages of the book between the sets being provided with enlarged map sections of areas illustrated in the sets and the enlarged map sections as well as the sections in the sets having indicating means for indicating the direction in the book in which the corresponding part is arranged.

ARTHUR E. BLOOMFIELD.